(12) United States Patent
Lee et al.

(10) Patent No.: US 11,384,771 B2
(45) Date of Patent: Jul. 12, 2022

(54) COMPRESSOR

(71) Applicant: LG Electronics Inc., Seoul (KR)

(72) Inventors: Kangwook Lee, Seoul (KR); Nayoung Jeon, Seoul (KR); Cheolhwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 174 days.

(21) Appl. No.: 16/668,815

(22) Filed: Oct. 30, 2019

(65) Prior Publication Data
US 2020/0132084 A1    Apr. 30, 2020

(30) Foreign Application Priority Data
Oct. 30, 2018  (KR) .................. 10-2018-0131195

(51) Int. Cl.
*F04D 29/12* (2006.01)
*F04D 29/10* (2006.01)
(Continued)

(52) U.S. Cl.
CPC ............. *F04D 29/102* (2013.01); *F04D 5/00* (2013.01); *F04D 5/002* (2013.01); *F04D 5/007* (2013.01); *F04D 29/046* (2013.01); *F04D 29/049* (2013.01); *F04D 29/0462* (2013.01); *F04D 29/063* (2013.01); *F04D 29/08* (2013.01);
(Continued)

(58) Field of Classification Search
CPC . F04D 31/00; F04D 5/00; F04D 5/002; F04D 5/007; F04D 29/046; F04D 29/0462; F04D 29/049; F04D 29/626; F04D 29/102; F04D 29/063; F16J 15/34
See application file for complete search history.

(56) References Cited

U.S. PATENT DOCUMENTS

2018/0298901 A1* 10/2018 Lee .................. F04C 23/008
2018/0328362 A1* 11/2018 Kim ................. F04C 29/026

FOREIGN PATENT DOCUMENTS

CN    2008064076    3/2008
CN    102144097     8/2011
(Continued)

OTHER PUBLICATIONS

European Search Report in European Appln. No. 19206206.5, dated Mar. 31, 2020, 7 pages.
(Continued)

*Primary Examiner* — Courtney D Heinle
*Assistant Examiner* — Andrew J Marien
(74) *Attorney, Agent, or Firm* — Fish & Richardson P.C.

(57) ABSTRACT

There is disclosed a compressor comprising a case comprising a discharging part provided one side and configured to discharge a refrigerant, the case defining a predetermined space for storing oil; a drive part comprising a rotor coupled to an inner circumferential surface of the case and having coils wound there around and configured to generate a rotation magnetic field, and a rotor mounted in the rotor and configured to be rotatable by the rotation magnetic field; a shaft extending in a state of being coupled to the rotor; a compression part lubricated by the oil in a state of being coupled to the shaft and configured to compress and discharge the refrigerant; and a sealing part extending from the stator towards the compression part and configured to induce the winding of the coil.

15 Claims, 7 Drawing Sheets

(51) Int. Cl.
　　　*F04D 29/063*　　(2006.01)
　　　*F04D 5/00*　　　(2006.01)
　　　*F04D 29/049*　　(2006.01)
　　　*F16J 15/34*　　　(2006.01)
　　　*F04D 29/62*　　　(2006.01)
　　　*F04D 31/00*　　　(2006.01)
　　　*F04D 29/046*　　(2006.01)
　　　*F04D 29/08*　　　(2006.01)

(52) U.S. Cl.
　　　CPC ........... *F04D 29/12* (2013.01); *F04D 29/126* (2013.01); *F04D 29/626* (2013.01); *F04D 31/00* (2013.01); *F16J 15/34* (2013.01)

(56) References Cited

FOREIGN PATENT DOCUMENTS

| | | | | |
|---|---|---|---|---|
| CN | 105370576 | 3/2016 | | |
| EP | 3388674 | 10/2018 | | |
| JP | 2011064067 | 3/2011 | | |
| JP | 2013-137004 | 7/2013 | | |
| JP | 2013137004 | * 7/2013 | ............. | F04C 29/12 |
| KR | 1020080036488 | 4/2008 | | |
| KR | 1020160017993 | 2/2016 | | |
| WO | WO 2015/085823 | 6/2015 | | |

OTHER PUBLICATIONS

CN Office Action in Chinese Appln. No. 201911044394.X, dated May 6, 2021, 11 pages (with English translation).

\* cited by examiner

COMPRESSOR

CROSS-REFERENCE TO RELATED APPLICATIONS

This application claims priority to Korean Patent Application No. 10-2018-0131195, filed on Oct. 30, 2018, the entire contents of which is hereby incorporated by reference in its entirety.

BACKGROUND OF THE DISCLOSURE

Field of the Disclosure

Embodiments of the present disclosure relate to a compressor, more particularly, a compressor including a sealing part configured to maintain durability and a sealing ability, while preventing a refrigerant and oil from leaking between a compression part and a drive part.

Background of the Disclosure

Generally, a compressor is a mechanism that is applied to a freezing cycle of a refrigerator or an air conditioner (hereinafter, a freezing cycle) and configured to cause heat-exchange in such a freezing cycle by compressing a refrigerant.

The compressor may be categorized based on a method for compressing the refrigerant into a reciprocating compressor, a rotary compressor, a scroll compressor and the like. The scroll type compressor includes a fixed scroll and a rotary scroll that is rotatable with engaging with the fixed stroll so as to form a compression chamber between a fixed wrap of the fixed scroll and a rotary wrap of the rotary scroll.

The scroll compressor continuously compresses by means of scroll shapes engaging with each other, compared with the other compressor types, such that it may gain a relatively high compressor ratio. Also, the scroll compressor performs suction, compression, discharging smoothly such that it may gain a stable torque advantageously. With such advantages, the scroll compressors are broadly used in compressing the refrigerant in the air conditioner.

The conventional scroll compressor includes a case defining an exterior design and having a discharging part for discharging a refrigerant; a compression part fixed to the case and configured to compress the refrigerant; and a drive part fixed to the case and configured to drive the compression part. The compression part and the drive part are connected with each other via a shaft rotatably coupled to the drive part.

The compression part includes a fixed scroll fixed to the case and having a fixed wrap; and a rotary scroll configured to drive with engaging with the fixed wrap via the shaft. Such the conventional scroll compressor has the shaft that is eccentric and the rotary scroll is coupled to the eccentric shaft to rotate. Accordingly, the refrigerant is compressed while the rotary scroll is rotating on the fixed scroll.

In the conventional scroll compressor, the compression part is provided under the discharging part and the drive part is provided under the compression part. The shaft has one end coupled to the compression part and the other end penetrating the drive part.

The compression part is provided higher than the drive part to be closer to the discharging part such that the conventional scroll compressor may have a difficulty in supplying oil to the compression part. Also, the conventional scroll compressor disadvantageously requires a lower frame to support the shaft connected to the compression part from a lower area of the drive part. A gas power generated by the refrigerant in the scroll compressor will not match with the reaction supporting the gas power such that the scroll could tilt enough to deteriorate compression efficiency and reliability disadvantageously.

To solve such disadvantages are released a new scroll compressor having the drive part provided under the discharging part and the compression part provided under the drive part (hereinafter, a lower scroll compressor).

In such a lower scroll compressor, the drive part is provided closer to the discharging part than the compression part and the compression part is then provided most distant from the discharging part.

The lower scroll compressor includes the shaft having one end connected with the drive part and the other end supported by the compression part such that it requires no lower frame and the oil stored in a lower area of the case can be directly supplied to the compression part without passing through the drive part advantageously. In addition, when the shaft penetrates the compression part in the lower scroll compressor, acting points of the gas power and the reaction match on the shaft and scroll vibration or upsetting moment can be damped. Accordingly, compression efficiency and reliability may be secured.

Meanwhile, in the lower scroll compressor, the refrigerant discharged from the compression part is supplied to the discharging part by a muffler after passing through the compression part and the drive part. At this time, an outer circumferential surface of the rotor is closed such that the refrigerant drawn into the drive part may not leak. However, while being drawn into the drive part via the compression part, the refrigerant might be discharged towards an inner circumferential surface of the case by a centrifugal force disadvantageously.

Moreover, the oil discharged from the compression part while flowing towards the drive part might also leak towards the case, without being drawn into the drive part.

If some of such the refrigerant leaks between the drive part and the compression part, without being supplied to the discharging part, the performance of the compressor might deteriorate disadvantageously.

In addition, even if an additional closing member is provided in the drive part or the compression part to prevent leakage of oil or refrigerant, the conventional lower scroll compressor is more likely to be damaged by the strong vibration generated in the compression part.

Also, the closing member is not fixed in the conventional lower scroll compressor such that the oil or refrigerant might still leak.

The additional closing member provided in the compressor to prevent the refrigerant or oil leakage might be interfered with the drive part and the inference might deteriorate the durability or the closing member spaced apart from the drive part could not guarantee a sealing effect.

SUMMARY OF THE DISCLOSURE

Accordingly, an object of the present disclosure is to address the above-noted and other problems and provide a compressor that may induce the entire refrigerant discharged from the compression part towards the drive part.

Another object of the present disclosure is to provide a compressor that prevents the damage caused by the vibration of a sealing part configured to prevent refrigerant leakage.

A further object of the present disclosure is to provide a compressor that may maintain the durability of the drive part even if a drive part interferes with the sealing part.

A still further object of the present disclosure is to provide a compressor that may maximize a sealing effect of the sealing part by locating the sealing part in close contact with the drive part.

Embodiments of the present disclosure may provide a compressor comprising: a case comprising a discharging part provided one side and configured to discharge a refrigerant, the case defining a predetermined space for storing oil; a drive part comprising a rotor coupled to an inner circumferential surface of the case and having coils wound there around and configured to generate a rotation magnetic field, and a rotor mounted in the rotor and configured to be rotatable by the rotation magnetic field; a shaft extending in a state of being coupled to the rotor; a compression part lubricated by the oil in a state of being coupled to the shaft and configured to compress and discharge the refrigerant; and a sealing part extending from the stator towards the compression part and configured to induce the winding of the coil.

The drive part may further comprise an insulator extending from the stator towards the compression part and configured to induce the winding of the coil, and the sealing part may be provided in the insulator.

The sealing part may comprise a sealing body provided along an inner circumferential surface of the insulator; and a flow hole provided in the sealing body and configured to allow the oil and the refrigerant to pass there through. The sealing body may closely contact with an inner circumferential surface of the insulator when the compression part discharges the refrigerant. The sealing body may be contactable with an inner circumferential surface of the insulator, while spaced apart from the compression part.

The stator may comprise a fixed body provided in an inner circumferential surface of the case and having the insulator coupled thereto; and a teeth portion extending from the fixed body towards the rotor to have the coil wound there around. At this time, the sealing body may be fixedly provided between the insulator and the coil wound around the teeth portion.

The compressor may further comprise an oil guider extending from the compression part towards the drive part and configured to prevent the oil or refrigerant from leaking outside the compression part and the oil guider and the insulator may be spaced apart from each other.

The oil guider may further comprise a guide rib extending from the compression part towards the drive part, and the sealing part may be configured to shield a gap formed between the insulator and the guide rib.

The guide rib may be spaced apart from the insulator, while provided in parallel with a free end of the insulator along the shaft. The sealing part may be held in inner circumferential surfaces of the guide rib and the insulator.

The guide rib extends from the compression part more inside than the insulator. The sealing body is provided between an outer circumferential surface of the guide rib and an inner circumferential surface of the insulator.

The oil guide may comprise a guider coupling portion coupled to the compression part, and the guide rib may extend from the guider coupling portion. The guide rib may be integrally formed with the compression part.

The sealing part may be formed of a flexible member.

The shaft may extend from the rotor in a direction that is getting farther from the discharging part, and the compression part may be configured to perform discharging in the direction that is getting farther from the discharging part and comprise a muffler coupled to the compression part and configured to guide the refrigerant towards the discharging part.

According to the embodiments, the compressor is capable of inducing the entire refrigerant discharged from the compression part towards the drive part.

Furthermore, the compressor is capable of preventing the damage caused by the vibration of a sealing part configured to prevent refrigerant leakage.

Still further, the compressor is capable of maintaining the durability of the drive part even if a drive part interferes with the sealing part.

Still further, the compressor is capable of maximizing a sealing effect of the sealing part by locating the sealing part in close contact with the drive part.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Reference will now be made in detail to the embodiments of the present disclosure, examples of which are illustrated in the accompanying drawings. Wherever possible, the same reference numbers will be used throughout the drawings to refer to the same or similar parts. A singular expression may include a plural expression unless otherwise stated in the context. In the following description, a detailed description of related known configurations or functions incorporated herein will be omitted to avoid obscuring the subject matter. The accompanying drawings illustrate the exemplary embodiments of the present disclosure. The exemplary embodiments of the present disclosure are merely provided to describe the present disclosure in detail, and the technical range of the present disclosure is not limited by the exemplary embodiments.

Figure 1:
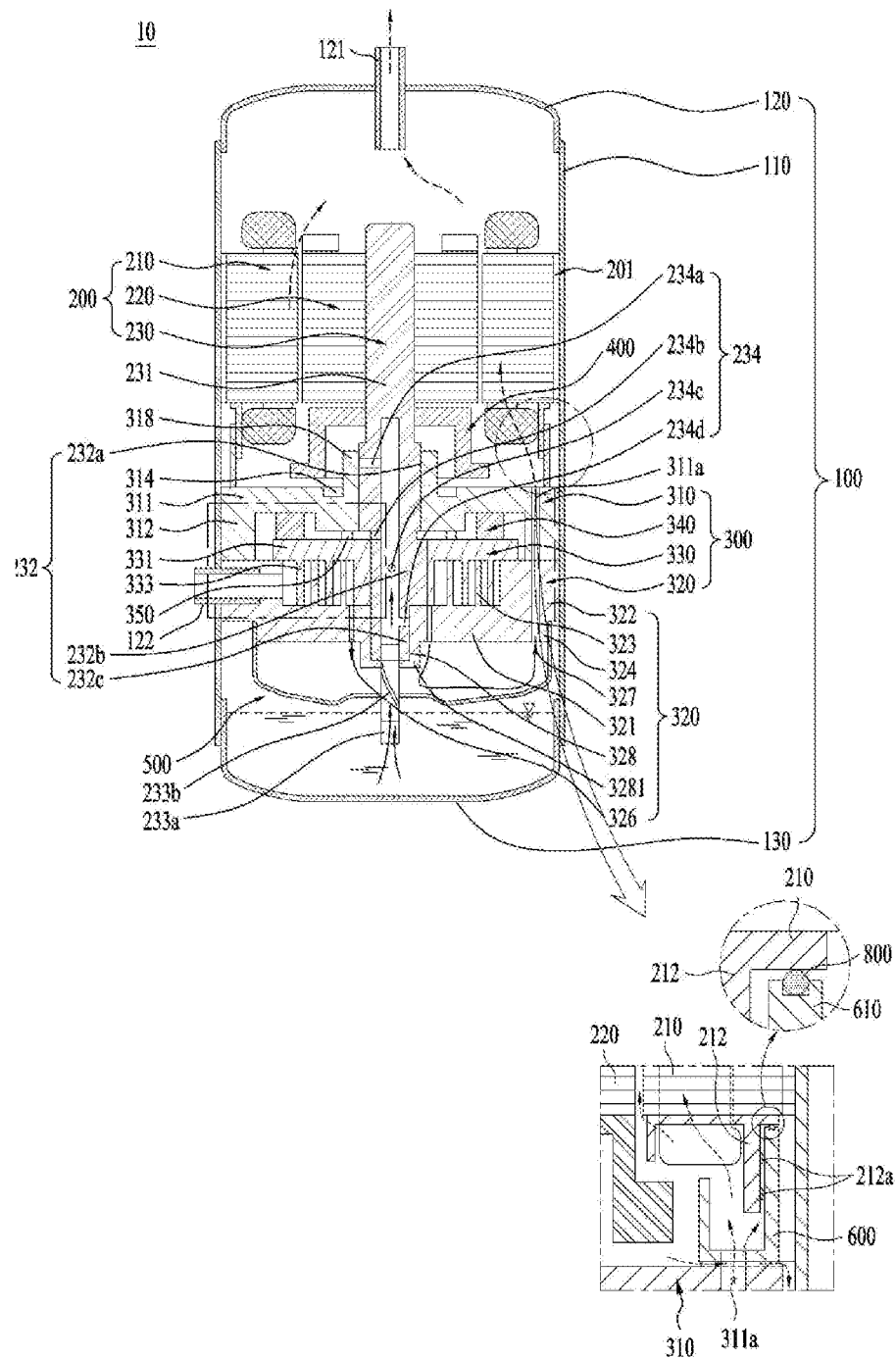
FIG. 1 is a diagram illustrating a basic structure of a lower scroll compressor according to the present disclosure.

FIG. 1 is a view illustrating the principal components of a lower scroll compressor 10 and functions of a separator according to the embodiment of the present disclosure. In more detail, FIG. 1 illustrates a view illustrating an internal structure of the lower scroll compressor according to the present disclosure, and an enlarged view illustrating the separator for separating oil and refrigerant from each other.

Referring to FIG. 1, the scroll compressor 10 may include a case 100, a drive part 200, and a compression part 300. The case 100 may include a reservoir space in which fluid is stored or moves. The drive part 200 may be coupled to an inner circumferential surface so as to rotate a rotary shaft 230. The compression part 300 may be coupled to the rotary shaft 230 in the case 100, and may be provided to compress fluid.

In more detail, the case 100 may include a discharge part 121 provided at one side thereof so that refrigerant is discharged through the discharge part 121. The case 100 may include a reception shell 110, a discharge shell 120, and an isolation shell 130. The reception shell 110 may be formed in a cylindrical shape, and may include the drive part 200 and the compression part 300. The discharge shell 120 may be connected to one end of the reception shell 110, and may include the discharge part 121. The isolation shell 130 may be coupled to the other end of the reception shell, and may seal the reception shell 110.

The drive part 200 may include a stator 210 to generate a rotary magnetic field, and a rotor 220 to rotate by the rotary magnetic field. The rotary shaft 230 may be coupled to the rotor 220, so that the rotary shaft 230 can rotate together with the rotor 220.

The stator 210 may include a plurality of slots. The plurality of slots may be formed at the inner circumferential surface of the stator 210 in a circumferential direction of the stator 210. Coils may be wound on the slots of the stator 210, so that the stator 210 can be fixed to the inner circumferential surface of the reception shell 110. The rotor 220 may be coupled to a permanent magnet, and may be rotatably coupled in the stator 210 to generate rotational power. The rotary shaft 230 may be press-fitted into a center point of the rotor 220.

The compression part 300 may include a fixed scroll 320, an orbiting scroll 330, and a main frame 310. The fixed scroll 320 may be coupled to the reception shell 110, and may be provided in the drive part 200 in the direction farther from the discharge part 121. The orbiting scroll 330 may be coupled to the rotary shaft 230, and may be engaged with the fixed scroll 320, resulting in formation of a compression chamber. The main frame 310 may include the orbiting scroll 330, and may be seated in the fixed scroll 330, resulting in formation of an outer appearance of the compression part 330.

As a result, the lower scroll compressor 10 may include the drive part 200 disposed between the discharge port 120 and the compression part 300. In other words, the drive part 200 may be provided at one side of the discharge part 120, and the compression part 300 may be provided in the drive part 200 in the direction farther from the discharge part 121. For example, when the discharge part 121 is provided at an upper part of the case 100, the compression part 300 may be provided at a lower part of the drive part 200, and the drive part 200 may be disposed between the discharge part 120 and the compression part 300.

As a result, when oil is stored in a bottom surface of the case 100, the oil can be directly supplied to the compression part 300 without passing through the drive part 200. In addition, the rotary shaft 230 is coupled to the compression part 300 and supports the compression part 300, so that a separate lower frame for rotatably supporting the rotary shaft 230 can be omitted from the compressor. On the other hand, the lower scroll compressor 10 according to the present disclosure may enable the rotary shaft 230 to pass through the orbiting scroll 330 and the fixed scroll 320, so that the rotary shaft 230 may be designed to be in surface contact with the orbiting scroll 330 and the fixed scroll 320.

Accordingly, inflow force (suction force) generated when fluid such as refrigerant flows into the compression part 300, gas force generated when the refrigerant is compressed in the compression part 300, and reaction force supporting the gas force may be applied to the rotary shaft 230 without change. Therefore, the inflow force, the gas force, and the reaction force may be applied to a single action point. As a result, no overturning moments are applied to the orbiting scroll 320 connected to the rotary shaft 230, so that tilting (or vibration) or overturning of the orbiting scroll 320 can be basically prevented. In other words, even axial vibration from among vibrations generated by the orbiting scroll 330 may be attenuated or prevented, and the overturning moments of the orbiting scroll 330 may also be attenuated or suppressed. As a result, vibration and noise generated in the lower scroll compressor 10 can be blocked.

In addition, the rotary shaft 230 may be in surface contact with the fixed scroll 320 in a manner that the fixed scroll 320 can be supported by the rotary shaft 230. Thus, even when the inflow force and the gas force are applied to the rotary shaft 230, durability of the rotary shaft 230 can be reinforced.

In addition, the rotary shaft 230 may absorb or support some parts of back pressure generated when the refrigerant is discharged outside, such that the rotary shaft 230 can reduce force (i.e., normal force) generated when the orbiting scroll 330 excessively and closely adheres to the fixed scroll 320 in the axial direction. As a result, frictional force between the orbiting scroll 330 and the fixed scroll 230 can be greatly reduced.

As a result, the compressor 10 may attenuate the axial tilting and overturning moments of the orbiting scroll 330 installed in the compression part 300, and may reduce frictional force of the orbiting scroll 330, resulting in improvement in efficiency and reliability of the compression part 300.

On the other hand, the main frame 310 from among constituent elements of the compression part 300 may include a main end plate 311, a main side plate 312, and a main bearing 318. The main end plate 311 may be provided either at one side of the drive part 200 or at a lower part of the drive part 200. The main side plate 312 may extend farther from the drive part 200 at the inner circumferential surface of the main end plate 311, and may be seated in the fixed scroll 330. The main bearing 318 may extend from the main end plate 311, and may rotatably support the rotary shaft 230.

The main end plate 311 or the main side plate 312 may further include a main hole through which refrigerant discharged from the fixed scroll 320 can be guided to the discharge part 121.

The main end plate 311 may further include an oil pocket 314 formed to be recessed at the outside of the main bearing 318. The oil pocket 314 may be formed in a circular shape, and may be eccentrically disposed in the main bearing 318.

When oil stored in the isolation shell 130 is transferred through the rotary shaft 230 or the like, the oil pocket 314 may allow the oil to flow into a portion where the fixed scroll 320 is engaged with the orbiting scroll 330.

The fixed scroll 320 may include a fixed end plate 321, a fixed side plate 322, and a fixed wrap 323. The fixed end plate 321 may be coupled to the reception shell 110 in the direction farther from the drive part 200 in the main end plate 311, and may form the other surface of the compression part 300. The fixed side plate 322 may extend from the fixed end plate 321 to the discharge part 121, and may be in contact with the main side plate 312. The fixed wrap 323 may be provided at the inner circumferential surface of the fixed side plate 322, and may form a compression chamber in which refrigerant is compressed.

Meanwhile, the fixed scroll 320 may include a fixed through-hole 328 and a fixed bearing 3281. The fixed through-hole 328 may be formed to enable the rotary shaft 230 to pass therethrough. The fixed bearing 3281 may extend from the fixed through-hole and may rotatably support the rotary shaft. The fixed bearing 3281 may be provided at the center of the fixed end plate 321. The fixed end plate 321 may be identical in thickness to the fixed bearing 3281. In this case, the fixed bearing 3281 may not extend without protruding from the fixed scroll 321, and may be interpolated into the fixed through-hole 328.

The fixed side plate 322 may allow the fixed wrap 323 to have an inlet hole 325 through which refrigerant is introduced, and may allow the fixed end plate 321 to have a discharge hole 326 through which the refrigerant is discharged. Although the discharge hole 326 is provided in the central direction of the fixed wrap 323, the discharge hole 326 may be spaced apart from the fixed bearing 3281 to prevent interference with the fixed bearing 3281, and the discharge hole 326 may also be implemented as a plurality of discharge holes 326 as necessary.

The orbiting scroll 330 may include an orbiting end plate 331 disposed between the main frame 310 and the fixed scroll 320, and an orbiting wrap 333 that forms a compression chamber along with the fixed wrap 323 at the orbiting end plate 331.

The orbiting scroll 330 may further include an orbiting through-hole 338 formed to pass through the orbiting end plate 331 in a manner that the rotary shaft 230 is rotatably coupled to the orbiting through-hole 338.

The rotary shaft 230 may be designed in a manner that a portion coupled to the orbiting through-hole 338 is eccentrically formed. Thus, when the rotary shaft 230 rotates, the orbiting scroll 330 may move while being engaged with the fixed wrap 323 of the fixed scroll 320, and may thus compress the refrigerant Specifically, the rotary shaft 230 may include a main shaft 231 and a bearing part 232. The main shaft 231 may be coupled to the drive part 200, and may rotate. The bearing part 232 may be connected to the main shaft 231, and may be rotatably coupled to the compression part 300. The bearing part 232 may be formed of a separate member different from the main shaft 231, so that the bearing part 232 may include the main shaft 231 therein and may be integrally formed with the main shaft 231. The bearing part 232 may include a main bearing part 232c inserted in a main shaft part 318 of a main frame 310 to be rotatably supported; a fixed bearing part 232a inserted in a fixed shaft 3281 of a fixed scroll 320 to be rotatably supported; and an eccentric shaft 232b inserted in a rotary through-hole 338 of a rotary scroll 330 to be rotatably supported and provided between the main bearing part 232c and the fixed bearing part 232b.

In this case, the main bearing part 232c and the fixed bearing part 232c may be coaxially formed to have the same axial center. The eccentric shaft 232b may have a center of gravity that is formed eccentrically in the radial direction with respect to the fixed bearing part 232c or the fixed bearing part 232a. In addition, the outer diameter of the eccentric shaft 232b may be larger than the outer diameter of the main bearing part 232c or the outer diameter of the fixed bearing part 232a. As such, during rotation of the bearing part 232, the eccentric shaft 232b enables the orbiting scroll 330 to perform orbital motion and at the same time provides force to compress the refrigerant. The orbiting scroll 330 may regularly perform such orbital motion by the eccentric shaft 232b in the fixed scroll 320.

However, in order to prevent rotation of the orbiting scroll 320, the compressor 10 according to the present disclosure may further include an Oldham ring 340 coupled to an upper part of the orbiting scroll 320. The Oldham ring 340 may be disposed between the orbiting scroll 330 and the main frame 310, and may contact both the orbiting scroll 330 and the main frame 310. The Oldham ring 340 may linearly move in four directions (i.e., forward, backward, left and right) so as to prevent rotation of the orbiting scroll 320.

Meanwhile, the rotary shaft 230 may be formed to completely pass through the fixed scroll 320 such that the rotary shaft 230 may protrude outward from the compression part 300. As a result, the rotary shaft 230 may directly contact the outside of the compression part 300 and oil stored in the isolation shell 130. The rotary shaft 230 rotates, and at the same time supplies oil to the compression part 300.

The oil may flow into the compression part 300 through the rotary shaft 230. The rotary shaft 230 or the indoor space of the rotary shaft 230 may be provided with an oil supply passage 234 through which the oil can be supplied to the outer circumferential surface of the main bearing part 232c, the outer circumferential surface of the fixed bearing part 232a, and the outer circumferential surface of the eccentric shaft 232b.

In addition, the soil supply path 234 may have a plurality of oil inlet holes 234a, 234b, 234c and 234d. specifically, the plurality of the oil inlet holes may include a first oil inlet hole 234a, a second oil inlet hole 234b, a third oil inlet hole 234c and a fourth oil inlet hole 234d. First of all, the first oil inlet hole 234a may be formed through an outer circumferential surface of the main bearing 232c.

The first oil inlet hole 234a may penetrate the outer circumferential surface of the main bearing 232c in the oil supply path 234. As another example, the first oil inlet hole 234a may be formed through an upper area of the outer circumferential surface and the embodiments of the present disclosure are not limited thereto. In other words, it may be formed through a lower area of the outer circumferential surface of the main bearing 232c. Different from what is illustrated in the drawings, the first oil inlet hole 234a may have a plurality of holes. If the first oil inlet hole 234a has the plurality of the holes, the holes may be formed only in the upper or lower areas of the outer circumferential surface of the main bearing 232c or both of the upper and lower areas.

In addition, the rotary shaft 230 may include an oil feeder 233. The oil feeder 233 may pass through a muffler 500 so as to contact oil stored in the case 100. The oil feeder 233 may include an extension shaft 233a and a spiral groove 233b. The extension shaft 233a may pass through the muffler 500 and may thus contact the oil. The spiral groove 233b may be spirally formed at the outer circumferential surface of the extension shaft 233a, and may communicate with the supply passage 234.

Accordingly, once the shaft 230 is rotated, the oil may be lifted through the oil feeder 233 and the supply path 234 by the spiral groove 233b, the viscosity of the oil and a pressure difference between the high pressure area and the low pressure area in the compression part 300, and then discharged towards the oil inlet holes 234a, 234b, 234c and 234d. The oil discharged through the oil inlet holes 234a, 234b, 234c and 234d may keep the sealed state by forming an oil film between the fixed scroll 250 and the rotary scroll 240, and also absorb and radiate the friction heat generated in the frictional area between the components of the compression part 300.

The oil guided along the shaft 230 and the oil supplied via the first oil inlet hole 234a may lubricate the main frame 310 and the shaft 230. In addition, the oil may be discharged via the second oil inlet hole 234b and supplied to an upper surface of the rotary scroll 330. The oil supplied to the upper surface of the rotary scroll 340 may be guided to the middle pressure chamber via the pocket groove 314. In this instance, the oil discharged via the first oil inlet groove 234a or the third oil inlet hole 234d as well as the second oil inlet hole 234b may be supplied to the pocket groove 314.

On the other hand, oil guided along the rotary shaft 230 may be supplied not only to the Oldham ring 340 disposed between the orbiting scroll 240 and the main frame 230, but also to the fixed side plate 322 of the fixed scroll 320, such that the degree abrasion of the fixed side plate 322 of the fixed scroll 320 and the degree of abrasion of the Oldham ring 340 can be reduced. In addition, oil supplied to the third oil hole 234c is also supplied to the compression chamber, such that the degree of abrasion caused by friction between the orbiting scroll 330 and the fixed scroll 320 can be reduced. In addition, an oil film is formed, and heat radiation is performed, resulting in improvement in compression efficiency.

Meanwhile, although the above-mentioned description relates to the centrifugal oil-feeding structure for allowing the lower scroll compressor 10 to supply oil to the bearing using rotation of the rotary shaft 230, the scope or spirit of the present disclosure is not limited thereto, and it should be noted that the present disclosure can also be applied not only to a differential pressure oil-feeding structure for supplying oil using a difference between inner pressures of the compression part 300, but also to a forced oil supply structure for supplying oil through a trochoid pump or the like without departing from the scope or spirit of the present disclosure.

On the other hand, the compressed refrigerant may be discharged through the discharge hole 326 along the space formed by the fixed wrap 323 and the orbiting wrap 333. It is more preferable that the discharge hole 326 be formed toward the discharge part 121. This is because it is most preferable that the refrigerant discharged through the discharge hole 326 be transferred to the discharge part 121 without a large change in the flow direction.

However, due to structural characteristics of the compressor in which the compression part 300 should be disposed in the direction farther from the discharge part 121 in the drive part 200 and the fixed scroll 320 should be disposed at the outermost part of the compression part 300, the discharge hole 326 may be provided in a manner that the refrigerant can be sprayed in the direction opposite to the discharge part 121.

In other words, the discharge hole 326 may be provided in a manner that the refrigerant can be sprayed in the direction farther from the discharge part 121 in the fixed end plate 321. Therefore, when the refrigerant flows into the discharge hole 326 without change, the refrigerant may not be smoothly discharged through the discharge part 121. When the oil is stored in the isolation shell 130, there is a possibility that the refrigerant collides with the oil so that the refrigerant may be cooled or mixed with the oil.

In order to solve the above-mentioned issue, the compressor 10 according to the present disclosure may further include a muffler 500 that is coupled to the outermost portion of the fixed scroll 320 and provides a space through which the refrigerant can be guided to the discharge part 121.

The muffler 500 may be formed to seal one surface arranged in the direction farther from the discharge part 121 from among several surfaces of the fixed scroll 320 such that the refrigerant discharged from the fixed scroll 320 can be guided to the discharge part 121.

The muffler 500 may include a coupling body 520 and a reception body 510. The coupling body 520 may be coupled to the fixed scroll 320. The reception body 510 may extend from the coupling body 520, and may form a sealed space. As a result, the flow direction of the refrigerant sprayed from the discharge hole 326 may be changed along the sealed space formed by the muffler 500, such that the resultant refrigerant can be discharged through the discharge part 121.

Meanwhile, the fixed scroll 320 is coupled to the reception shell 110, such that flow of the refrigerant may be disturbed by the fixed scroll 320 and the refrigerant may have difficulty in flowing to the discharge part 121. Thus, the fixed scroll 320 may further include a bypass hole 327 that passes through the fixed end plate 321 in a manner that the refrigerant can pass through the fixed scroll 320. The bypass hole 327 may communicate with the main hole 327. As a result, the refrigerant may sequentially pass through the compression part 300 and the drive part 200, and may finally be discharged through the discharge hole 121.

On the other hand, the refrigerant may be compressed at a higher pressure as the distance from the outer circumferential surface of the fixed wrap 323 to the innermost region of the fixed wrap 323 increases, so that the inside of the fixed wrap 323 and the inside of the orbiting wrap 333 can be maintained at a high pressure. Therefore, discharge pressure can be applied to the back surface of the orbiting scroll without change, and back pressure acting as a reaction to the discharge pressure may occur in the direction from the orbiting scroll to the fixed scroll. The compressor 10 may further include a back-pressure seal 350 that enables the back pressure to be concentrated at a coupling portion between the orbiting scroll 320 and the rotary shaft 230 so that a leakage between the orbiting wrap 333 and the fixed wrap 323 can be prevented.

The back-pressure seal 350 may be formed in a ring shape in a manner that the inner circumferential surface thereof can be maintained at a high pressure, and the outer circumferential surface of the back-pressure seal 350 may be separated to be maintained at an intermediate pressure lower than the high pressure. Thus, the back pressure can be concentrated at the inner circumferential surface of the back-pressure seal 350, so that the orbiting scroll 330 can be in close contact with the fixed scroll 320.

In this case, considering that the discharge hole 326 is spaced apart from the rotary shaft 230, the center point of the back-pressure seal 250 may be biased to the discharge hole 326. On the other hand, when refrigerant is discharged through the discharge part 121, the oil supplied to the compression part 300 or the oil stored in the case 100 may move along with the refrigerant in an upward direction of the case 100. In this case, the oil may have higher density than the refrigerant so that the oil may not move to the discharge part 121 by centrifugal force generated by the rotor 220 and may be attached to the inner walls of the discharge shell 110 and the reception shell 120. Each of the drive part 200 and the compression part 300 of the lower scroll compressor 10 may further include a recovery flow passage at the outer circumferential surface thereof in a manner that oil attached to the inner wall of the case 100 can be collected either in the reservoir space of the case 100 or in the isolation shell 130.

The recovery passage may include a drive recovery passage 201 provided at the outer circumferential surface of the drive part 200, a compression recovery passage 301 provided at the outer circumferential surface of the compression part 300, and a muffler recovery passage 501 provided at the outer circumferential surface of the muffler 500.

The drive recovery passage 201 may be formed when some parts of the outer circumferential surface of the stator 210 are recessed. The compression recovery passage 301 may be formed when some parts of the outer circumferential surface of the fixed scroll 320 are recessed. In addition, the muffler recovery passage 501 may be formed when some parts of the outer circumferential surface of the muffler are recessed. The drive recovery passage 201, the compression recovery passage 301, and the muffler recovery passage 501 may communicate with one another in a manner that oil can pass through the drive recovery passage 201, the compression recovery passage 301, and the muffler recovery passage 501.

As described above, the center of gravity of the rotary shaft 230 may be biased to one side due to the eccentric shaft 232b, unbalanced eccentric moments may occur in rotation of the rotary shaft 230, so that overall unbalance may be distorted. Therefore, the lower scroll compressor 10 according to the present disclosure may further include a balancer 400 capable of offsetting eccentric moments caused by the eccentric shaft 232b.

Since the compression part 300 is fixed to the case 100, it is more preferable that the balancer 400 be coupled to the rotary shaft 230 or the rotor 220. Therefore, the balancer 400 may include a central balancer 410 and an outer balancer 420. The central balancer 400 may be provided either at the lower end of the rotor 220 or at one surface facing the compression part 300 in a manner that eccentric load of the eccentric shaft 232b can be offset or reduced. The outer balancer 420 may be coupled to the upper end of the rotor 220 or the other surface facing the discharge part 121 in a manner that the eccentric load or the eccentric moment of at least one of the eccentric shaft 232b and the lower balancer 420 can be offset or cancelled.

The central balancer 410 may be provided in relatively close proximity to the eccentric shaft 232b, so that the central balancer 410 can directly offset the eccentric load of the eccentric shaft 232b. Thus, the central balancer 410 may be biased in the direction opposite to the eccentric direction of the eccentric shaft 232b. As a result, even when the rotary shaft 230 rotates at a low speed or at a high speed, the rotary shaft 230 is located closer to the eccentric shaft 232b, so that eccentric force or eccentric load generated by the eccentric shaft 232b can be effectively offset or cancelled in a substantially uniform manner.

The outer balancer 420 may also be biased in the direction opposite to the eccentric direction of the eccentric shaft 232b. However, the outer balancer 420 may also be biased in the direction corresponding to the eccentric shaft 232b in a manner that the eccentric load generated by the central balancer 410 can be partially offset or cancelled.

Thus, the central balancer 410 and the outer balancer 420 may offset the eccentric moments generated by the eccentric shaft 232b, and may assist the rotary shaft 230 to stably rotate.

Meanwhile, the lower scroll compressor 10 according to the present disclosure may include the drive part 200 provided between the compression part 300 and the discharging part 120 such that the refrigerant may be inevitably drawn into the drive part 200 past the compression part 300 before discharged to the discharging part 120. At this time, as the compression part 300 and the drive part 200 are spaced apart from each other, the refrigerant drawn towards the drive part 200 could leak between the compression part 300 and the drive part 200.

In addition, when the refrigerant leaks, the oil discharged from the compression part 300 together with the refrigerant could also leak between the compression part 300 and the drive part 200.

Accordingly, the lower scroll compression 10 according to the present disclosure might have deteriorated compression efficiency or the drive part might be damaged unless the rotor 220 and the stator 210 are lubricated smoothly.

To prevent that, the lower scroll compressor 10 may further include an oil guider 600 extending towards the drive part 200 from the main frame 310 and configured to prevent the oil leakage.

The oil guider 600 may extend to one surface of the drive part 200 and a shielding ring 800 may be installed in an area where the oil guider 600 faces the drive part 200 to shield a gap.

Meanwhile, the stator 210 may include a fixed body 211 where coils are wound; and an insulator 212 extending from the fixed body 211 and configured to induce the winding of the coils. The shielding ring 800 might disadvantageously interfere with and then damage the insulator 212 extending from the stator 210 during the vibration.

Moreover, at least one projection 212 may be provided in the insulator 212 to induce the winding of the coils. At this time, the shielding ring 800 might damage the projection 212b disadvantageously.

To maximize the sealing effect, the oil guider 600 generally extends until to face an outer circumferential surface of the insulator 212. At this time, the oil guider 600 and the insulator 212 are likely to be damaged by the interference between them.

To solve that, the lower scroll compressor 10 according to the present disclosure may include a sealing part 700 configured to maintain the durability of the insulator 212 and maximize the sealing effect simultaneously.

Figure 2:
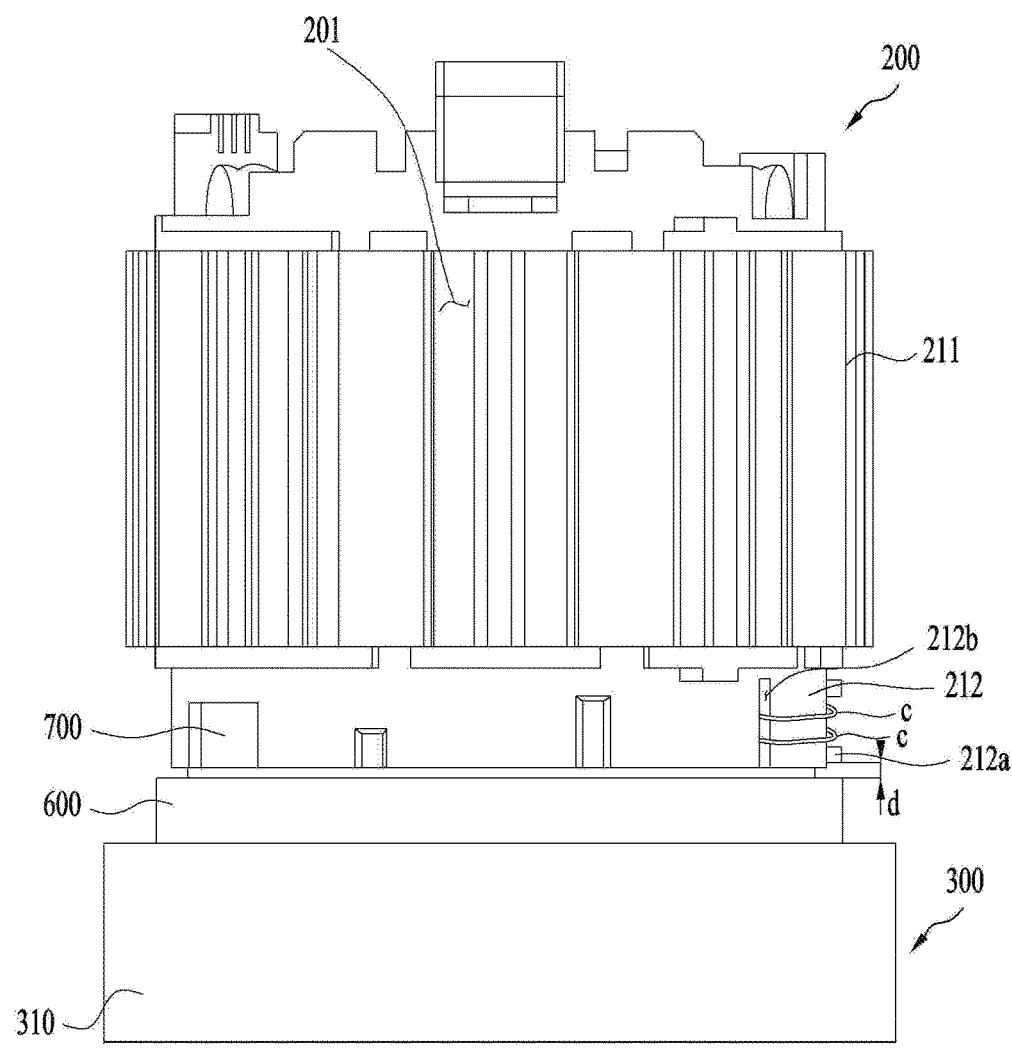
FIG. 2 is a diagram illustrating an exterior design of a drive part provided in the lower scroll compressor.

FIG. 2 mainly illustrates the drive part and the compression part of the lower scroll compressor.

The drive part 200 of the lower scroll compressor 10 according to the present disclosure may include the fixed body 211 coupled to an inner circumferential surface of the case 100; and the insulator 212 extending towards the compression part 300 from a lower area of the fixed body 211 so as to induce the winding of the coil C.

The fixed body 211 may include a drive collection path 201 configured to re-collect the oil in a storage space of the case.

The insulator 212 may include at least one slit 212 and a projection 212b configured to induce the winding of the coils in the fixed body 211.

The compression part 300 may further include the oil guider 600 extending towards the drive part 200 and preventing the oil and the refrigerant from leaking to the outside of the compression part 300. The oil guider 600 may prevent the refrigerant discharged from the bypass hole 327 of the compression part 300 from leaking between the drive part and the compression part when being drawing into the drive part 200.

In this instance, the oil guider 600 may extend from the compression part 300 to be spaced a distance d from the insulator 212. In other words, the oil guider 600 may be provided not to face the inner or outer circumferential surface of the insulator 212. Accordingly, the lower scroll compressor 10 according to the present disclosure may prevent the oil guider 600 from contacting with the insulator 212 in advance such that it can prevent the damage to the projection 212b or the coil C.

Meanwhile, the lower scroll compressor 10 may include the sealing part 700 provided between the drive part 200 and the compression part 300 and configured to prevent the refrigerant or oil discharged from the compression part from leaking outside the stator or compression part. The sealing part 700 may be provided in the insulator 212. The sealing part 700 may be provided at inward of the insulator 212. Accordingly, the sealing part 700 may be in close contact with the insulator, without the interference of the projection 212b or the coil C, and then it is able to shut off the leakage of the refrigerant or oil.

Figure 3:
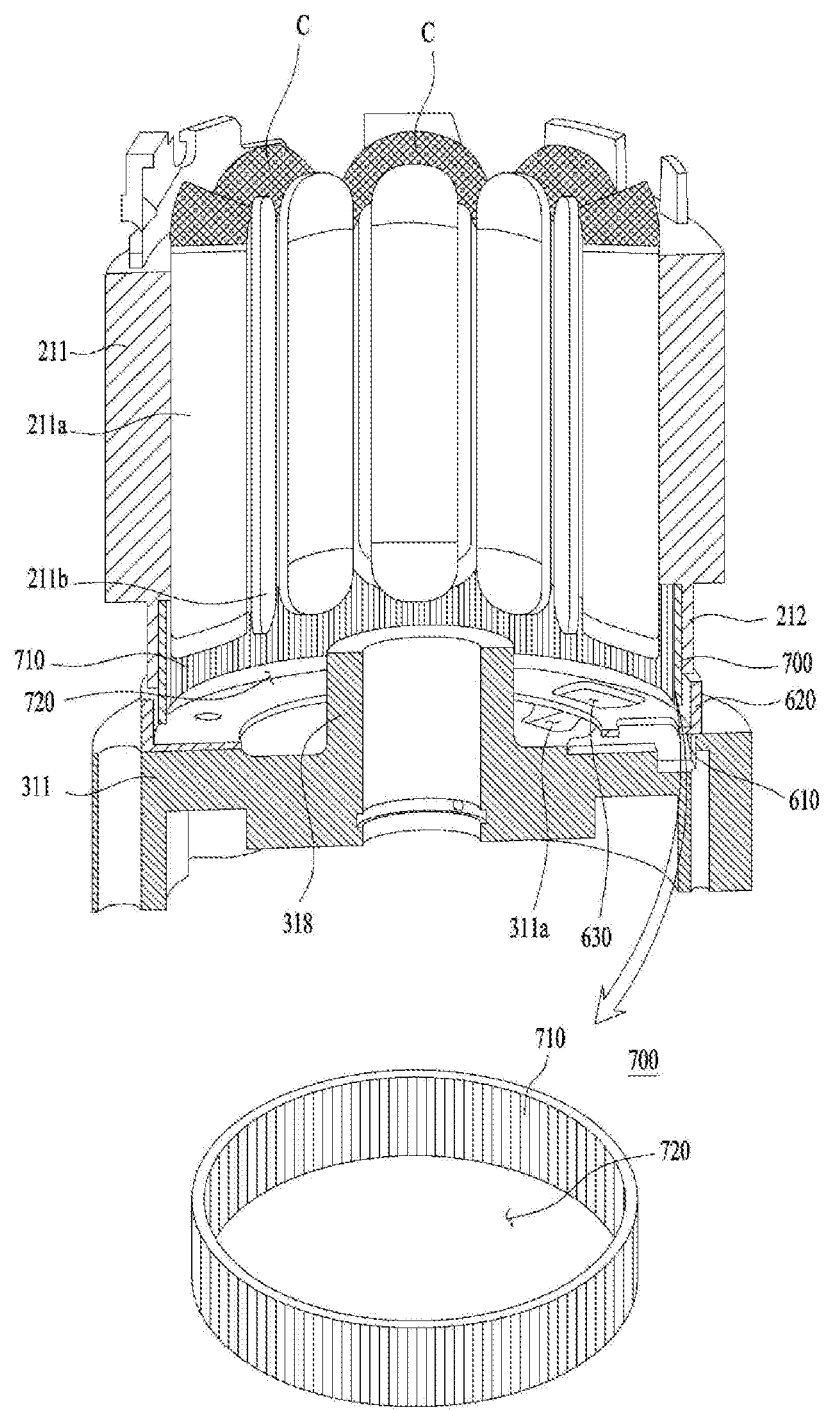
FIG. 3 is a sectional diagram illustrating a drive part and a sealing structure of the lower scroll compressor.

FIG. 3 is a sectional diagram illustrating the drive part 200 and the sealing part 700 that are provided in the lower scroll compressor 10 according to the present disclosure.

The stator 200 may include the fixed body 211 defining the exterior design; a teeth portion 211 extending from the fixed body 211 towards the rotor 220 to have the coils C wound there around; and a pole shoe 211b formed from an end of the teeth portion 211a to face the rotor 220 and configured to prevent the escape of the coils C. The insulator 212 may extend from the fixed body 211 towards the drive part 300 and induce the coils C to be wound around one tooth of the teeth portion 211a and then another tooth. Also, the insulator 212 may protect the coils C from the drive part 200.

The sealing part 700 of the lower scroll compressor 10 according to the present disclosure may include a sealing body 710 provided along the inner circumferential surface of the insulator; and a flow hole 720 provided in the sealing body to allow the oil and the refrigerant to pass there through.

The sealing body 710 may be a circular rib that is much thicker than the gap d between the insulator 212 and the oil guider 600. The sealing body 710 may be in close contact with the inner circumferential surface of the insulator 212. Accordingly, the sealing body 710 is able to keep the shielding of the gap d even if the vibration is transmitted to the sealing part 700.

In addition, the sealing body 210 is able to contact with the insulator 212, while spaced apart from the compression part 300. In other words, an edge or a lower end of the sealing body 210 may be spaced a preset distance apart from the main plate 311 or the oil guider 600. Accordingly, the sealing body 210 may be prevented from being worn by the contact with the compression part 300 caused by the vibration.

Meanwhile, the sealing body 210 may be formed of a flexible member. Even if contacting with the insulator 212, the sealing body 210 will not damage the insulator 212 and the coils C. In addition, the sealing body 210 may compensate the unevenness of the insulator surface, even if a surface of the insulator is uneven, and then closely contact with the insulator 212.

In other words, the sealing part 700 may be formed of the flexible member and provided in the inner circumferential surface of the insulator 212. When the refrigerant and oil discharged from the bypass hole 327 presses the sealing body 210 with a high pressure, the sealing body 210 is able to contact with the insulator 212 more closely. Accordingly, the sealing effect for shielding the gap d may be maximized.

The oil guider 600 may include a guider coupling portion 610 coupled to the main end plate 311; a guide rib 620 extending from the guider coupling portion 610 towards the drive part 200; and a guide hole 630 formed via the guider coupling portion 610 to communicate with the main hole 311a and configured to discharge the refrigerant and the oil there through.

The guide rib 620 may be provided to face a free end of the insulator 212, spaced a preset distance apart from the insulator 212. In other words, the guide rib 620 may be provided in parallel with the free end of the insulator 212 along the shaft 230. Accordingly, the sealing body 710 may contact with the inner circumferential surface of the insulator 212 and the inner circumferential surface of the guide rib 620 at the same time.

Figure 4:
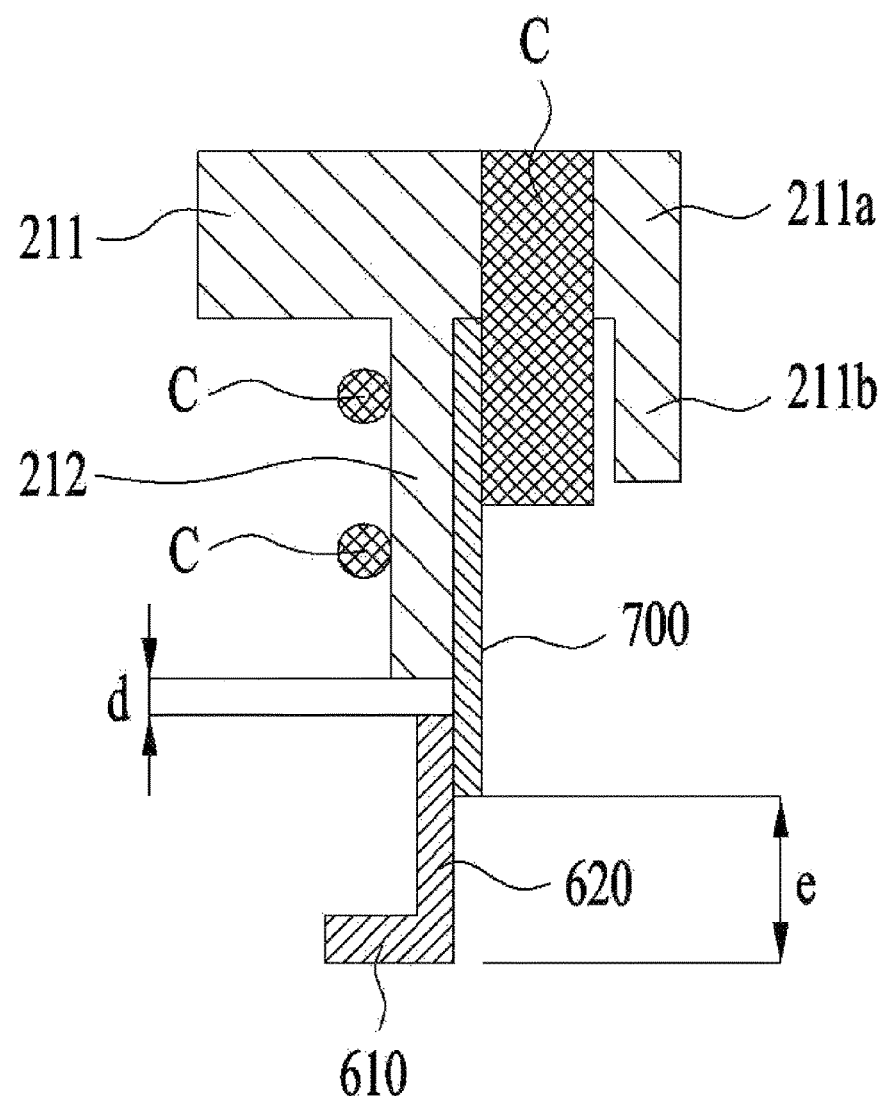
FIG. 4 is a diagram illustrating a structure of a sealing part provided in the lower scroll compressor.

FIG. 4 illustrates one embodiment of the sealing part 700 installed in the drive part 200.

The sealing part 700 may have the sealing body 710 fixed between the coils C wound around the teeth portion 211a and the insulator 212. Specifically, the thickness of the sealing body 710 may be equal to or larger than the gap between the outer circumferential surface of the coil C and the inner circumferential surface of the insulator 212. Accordingly, one end of the sealing body 710 may be fixedly fitted to the insulator such that an auxiliary fixing member may be omitted.

One end of the sealing body 710 may be in contact with the teeth portion 211a and the other end may be in contact with the main end plate 311.

However, as shown in the drawings, the sealing body may be distant as far as e from the guider coupling portion 620 or the main end plate 311. That is to prevent the wearing of the sealing body 710 when the drive part 200 and the compression part 300 are vibrated with different frequencies or amplitudes.

Figure 5A:
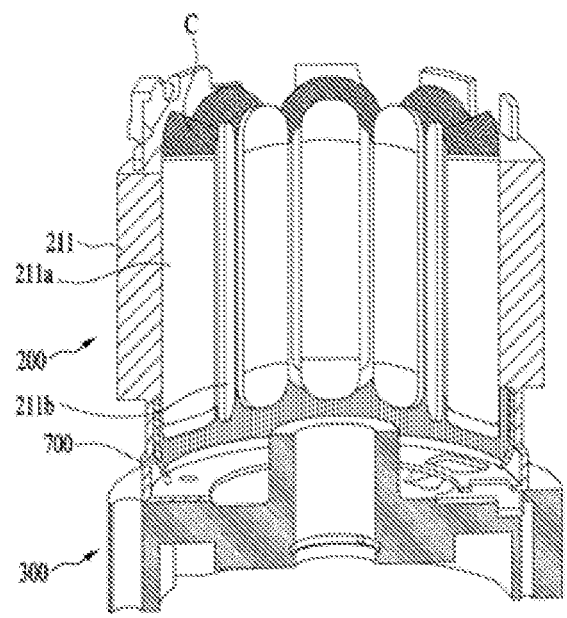
FIGS. 5A and 5B are diagrams illustrating an operation embodiment of the sealing part provided in the lower scroll compressor.
Figure 5B:
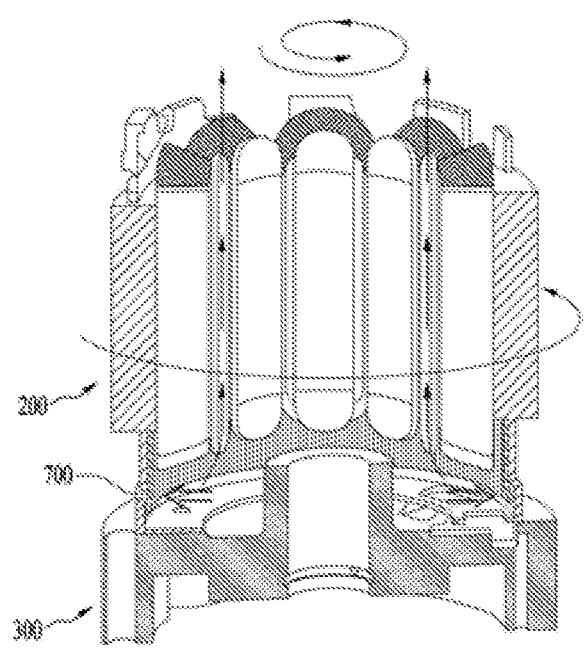

FIGS. 5A and 5B illustrate one embodiment that the sealing part 700 shields the refrigerant and the oil.

Referring to FIG. 5A, one end of the sealing body 710 may be secured between the insulator 212 and the coil C or attached to the insulator 212, in a state where the drive part 200 is paused. Here, the sealing body 710 is made of the flexible member such that the other end of the sealing body 710 may be spaced a preset distance apart from the insulator 212.

Referring to FIG. 5B, once the drive part 200 is operated, the rotor 220 may be rotated by the rotation magnetic field of the stator 210 and the compression part 300 may be also driven. At this time, some of the refrigerant and oil compressed in the compression part 300 may be discharged via the main hole 211.

The discharged refrigerant and oil may flow towards the drive part 300. At this time, the refrigerant and the oil are high-pressured enough to raise the pressure of the space defined between the compression part 300 and the drive part 200 and the sealing body 710 can contact with the inner circumferential surfaces of the oil guider 600 and the insulator 212 from one end to the other end.

Accordingly, the sealing body 710 may completely shield the gap formed by the insulator 212 and the oil guider 600 and then prevent the leakage of the refrigerant and oil.

Figure 6:
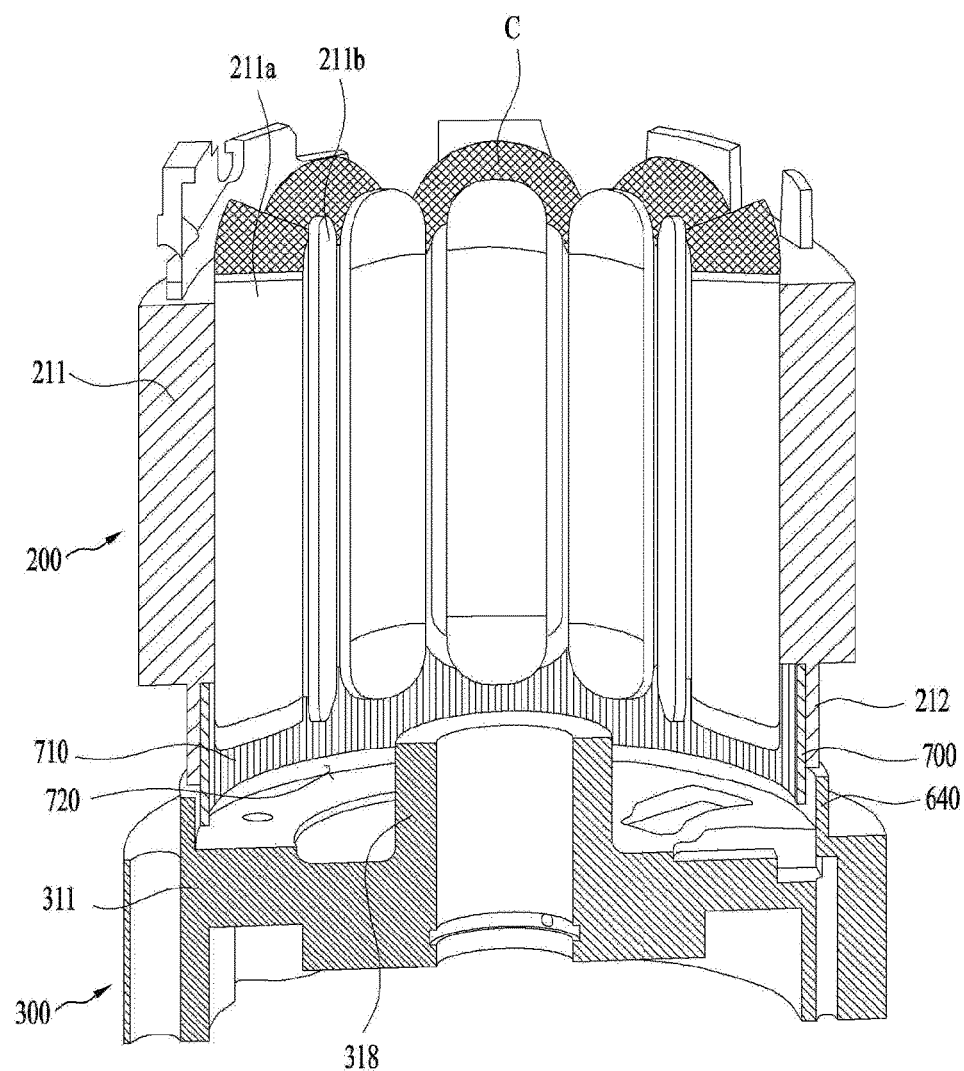
FIG. 6 is a diagram illustrating another embodiment of the sealing structure of the lower scroll compressor.

FIG. 6 illustrates another embodiment of the lower compressor 10.

Referring to FIG. 6, the oil guider 600 may be integrally formed with the main frame 310. In other words, the oil guider 600 may include a second guide rib 640 extending from the main end plate towards the compression part 300.

Accordingly, the guider coupling portion or an additional coupling process for coupling the second guider 640 to the main end plate 311 may be omitted.

Figure 7:
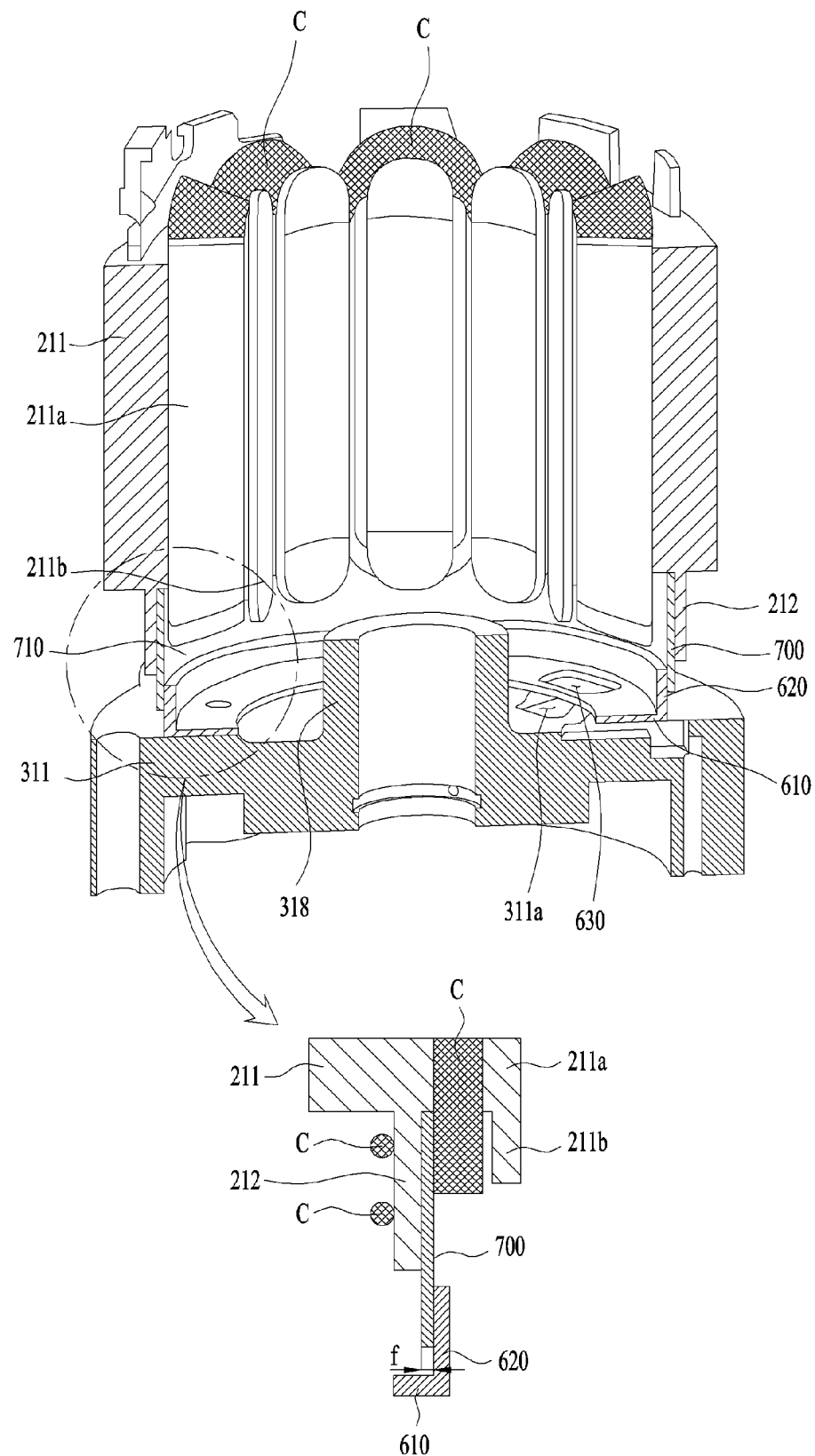
FIG. 7 is a diagram illustrating a further embodiment of the sealing structure.

FIG. 7 illustrates a further embodiment of the lower compressor 10 according to the present disclosure.

The oil guider 600 of the lower compressor 10 according to the present disclosure may include a guide rib 620 provided an inner area with respect to the insulator 212, not in parallel with the insulator 212.

In other words, a diameter of the guide rib 620 may be smaller than a diameter of the insulator and the guide rib 620 may extend farther from the compression part 300 than the free end of the insulator along the shaft or inside.

Then, the sealing body 710 may be arranged between the inner circumferential surface of the insulator 212 and the outer circumferential surface of the guide rib 610. Even if an external shock is applied to the sealing body 710, the sealing body may be arranged along the insulator 212 uniformly.

Meanwhile, the guide rib 620 may be distant from the inner circumferential surface of the insulator as far as or less farther than the thickness f of the sealing body 710.

Accordingly, the sealing body 710 can be fitted between the insulator 212 and the guide rib 620. Also, the sealing body 710 can completely shield the gap formed between the insulator 212 and the oil guider 600.

At this time, the sealing body 710 may be in close contact with the inner circumferential surface of the insulator 212 such that some are of the guide rib 610 may extend longer to be located in the inner circumferential surface of the insulator 212.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A compressor comprising:
a case that defines an inner space configured to store oil and that comprises a discharging part disposed at one side of the case and configured to discharge refrigerant;
a drive part comprising:
a stator that is coupled to an inner circumferential surface of the case and includes a teeth portion and coils wound around the teeth portion to generate a magnetic field, and
a rotor mounted in the stator and configured to rotate relative to the stator based on the magnetic field;
a shaft that is coupled to the rotor and that extends along the rotor;
a compression part coupled to the shaft and configured to compress and discharge the refrigerant, the compression part being configured to be lubricated by the oil; and
a sealing part disposed between the drive part and the compression part and configured to block leakage of the refrigerant or the oil from a region between the drive part and the compression part;
an insulator that extends from the stator toward the compression part and that is configured to guide winding of a portion of the coils therearound; and
an oil guider comprising:
a guide rib that extends from the compression part toward the drive part and is configured to block leakage of the oil or the refrigerant from the compression part, the guide rib protruding toward the drive part relative to an upper surface of the compression part, and
a guider coupling portion that extends radially outward from an end of the guide rib along the upper surface of the compression part,
wherein a bottom surface of the guider coupling portion is in contact with the upper surface of the compression part,
wherein the sealing part covers a gap between the insulator and the guide rib, the sealing part comprising a sealing body that extends along an inner circumferential surface of the insulator, that is fixed at a position between the insulator and the portion of the coils wound around the teeth portion, and that is configured to contact the inner circumferential surface of the insulator based on the compression part discharging the refrigerant, and
wherein the sealing body defines a flow hole configured to allow the oil and the refrigerant to pass therethrough.

2. The compressor of claim 1, wherein the sealing part is made of a flexible member.

3. The compressor of claim 1, wherein the sealing body is configured to contact the inner circumferential surface of the insulator in a state in which the sealing body is spaced apart from the compression part.

4. The compressor of claim 1, wherein the stator further comprises a fixed body coupled to the inner circumferential surface of the case, the insulator extending from the fixed body toward the compression part, and
wherein the teeth portion extends from the fixed body toward the rotor.

5. The compressor of claim 1, wherein the guide rib extends from the compression part toward an end of the insulator, and
wherein the sealing part is disposed at an inner region of the guide rib facing the shaft.

6. The compressor of claim 5, wherein an inner circumferential surface of the insulator and an inner circumferential surface of the guide rib face the shaft and define a plane that extends parallel to the shaft, and
wherein the sealing part contacts both of the inner circumferential surface of the insulator and the inner circumferential surface of the guide rib.

7. The compressor of claim 1, wherein the guide rib extends from the compression part toward an inside of the insulator facing the shaft, and
wherein the sealing part is disposed radially between an outer circumferential surface of the guide rib and an inner circumferential surface of the insulator.

8. The compressor of claim 7, wherein the guide rib is spaced apart from the insulator and disposed radially inward of the insulator toward the shaft, and
wherein the sealing part contacts both of the outer circumferential surface of the guide rib and the inner circumferential surface of the insulator.

9. The compressor of claim 1, wherein the guide rib extends from an inner end of the guider coupling portion toward the drive part, the inner end of the guider coupling portion being connected to the end of the guide rib.

10. The compressor of claim 9, wherein a distance from the inner end of the guider coupling portion to an end of the sealing body is greater than a size of the gap between the insulator and the guide rib.

11. The compressor of claim 1, wherein the sealing body has a first end that is in contact with the teeth portion and a second end that is spaced apart from the upper surface of the compression part.

12. The compressor of claim 11, wherein a distance from the second end of the sealing body to the upper surface of the compression part is greater than a size of the gap between the insulator and the guide rib.

13. The compressor of claim 1, wherein the guide rib surrounds the sealing body and defines a through-hole that is in communication with the flow hole of the sealing body.

14. A compressor comprising:
a case that defines an inner space configured to store oil and that comprises a discharging part disposed at one side of the case and configured to discharge refrigerant;
a drive part comprising:
a stator that is coupled to an inner circumferential surface of the case and includes a teeth portion and coils wound around the teeth portion to generate a magnetic field, and
a rotor mounted in the stator and configured to rotate relative to the stator based on the magnetic field;
a shaft that is coupled to the rotor and that extends along the rotor;
a compression part coupled to the shaft and configured to compress and discharge the refrigerant, the compression part being configured to be lubricated by the oil; and
a sealing part disposed between the drive part and the compression part and configured to block leakage of the refrigerant or the oil from a region between the drive part and the compression part;
an insulator that extends from the stator toward the compression part and that is configured to guide winding of a portion of the coils therearound; and
an oil guider comprising a guide rib that extends from the compression part toward the drive part and is configured to block leakage of the oil or the refrigerant from the compression part, the guide rib protruding toward the drive part relative to an upper surface of the compression part,
wherein the sealing part covers a gap between the insulator and the guide rib, the sealing part comprising a sealing body that extends along an inner circumferential surface of the insulator, that is fixed at a position between the insulator and the portion of the coils wound around the teeth portion, and that is configured to contact the inner circumferential surface of the insulator based on the compression part discharging the refrigerant,
wherein the sealing body defines a flow hole configured to allow the oil and the refrigerant to pass therethrough, and
wherein the sealing body has a first end that is in contact with the teeth portion and a second end that is spaced apart from the upper surface of the compression part.

15. The compressor of claim 14, wherein a distance from the second end of the sealing body to the upper surface of the compression part is greater than a size of the gap between the insulator and the guide rib.

* * * * *